United States Patent [19]
Kovalovsky

[11] Patent Number: 4,479,616
[45] Date of Patent: Oct. 30, 1984

[54] EXTENDABLE CRANK HANDLE
[76] Inventor: Oscar Kovalovsky, 11154 Debby St., North Hollywood, Calif. 91606
[21] Appl. No.: 282,410
[22] Filed: Jul. 13, 1981
[51] Int. Cl.³ .................. A01K 89/00; G05G 1/00
[52] U.S. Cl. .................... 242/84.1 J; 74/546
[58] Field of Search ............ 242/84.1 J, 84.1 R, 242/84.2 R, 84.21 R, 84.26; 74/546, 547, 528

[56] References Cited
U.S. PATENT DOCUMENTS 2,326,023  8/1943  Fredricksen ............ 242/84.1 J
3,011,362  12/1961  Cronholm ..................... 74/546
3,375,993  4/1968  Hayes ................... 242/84.1 J
3,606,193  9/1971  Allred ................... 242/84.1 J Primary Examiner—Billy S. Taylor
Attorney, Agent, or Firm—Roger A. Marrs

[57] ABSTRACT

An extendable crank handle is disclosed herein having an elongated body provided with a channel for slidably receiving a crank bar which is moved between an extended position to increase the throw of the crank movement and a retracted position which decreases the throw of the crank movement. The body and the slide bar include corresponding cut-out portions for operably carrying an over-center toggle mechanism for yieldably retaining the slide bar in either of the two positions. Limit stops are provided on the body for limiting the movement of the slide bar in either of the two positions.

5 Claims, 5 Drawing Figures

U.S. Patent  Oct. 30, 1984  4,479,616
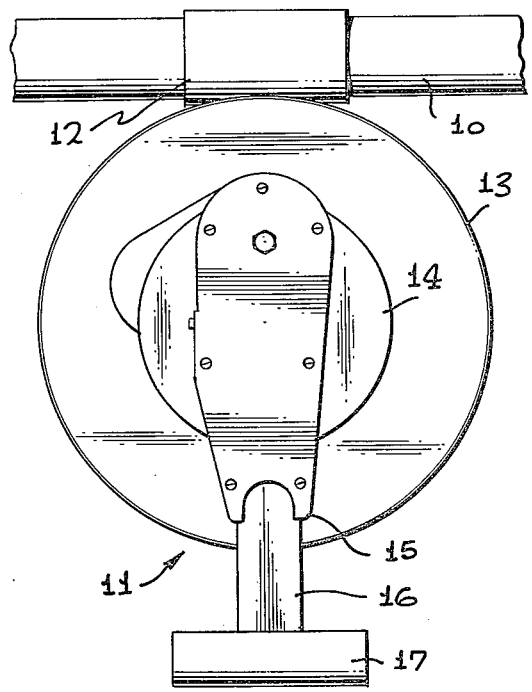
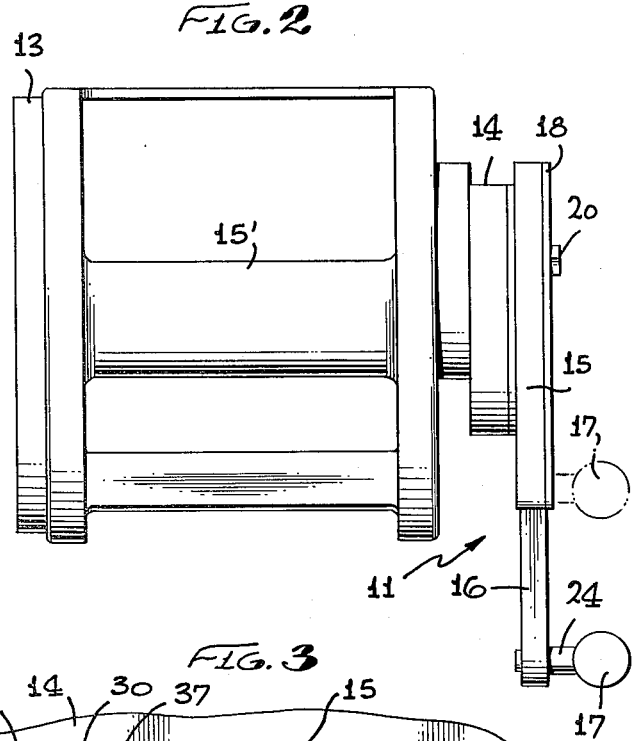
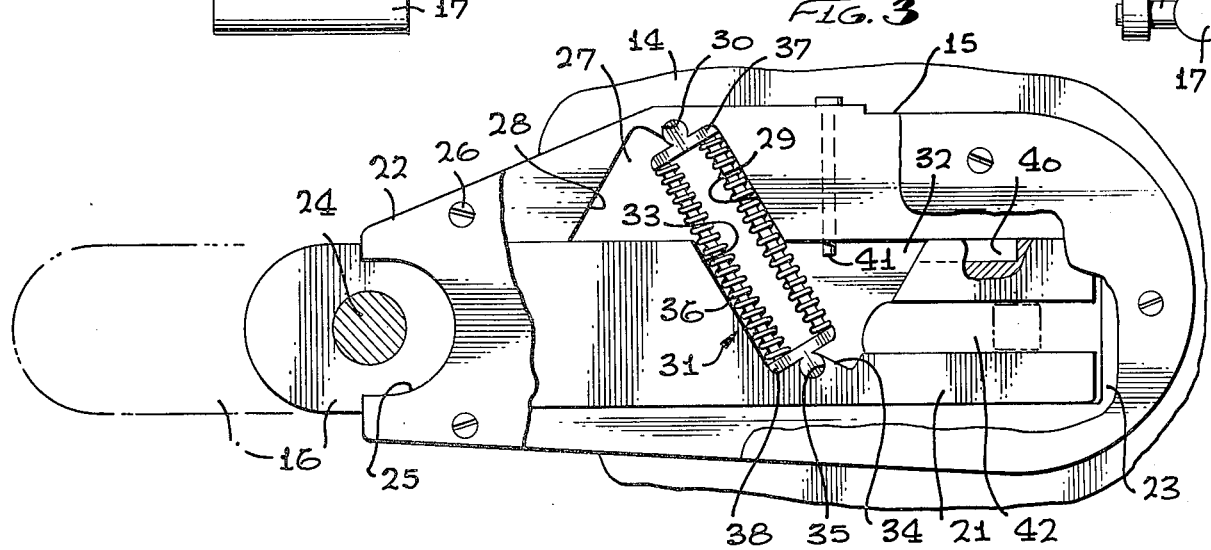
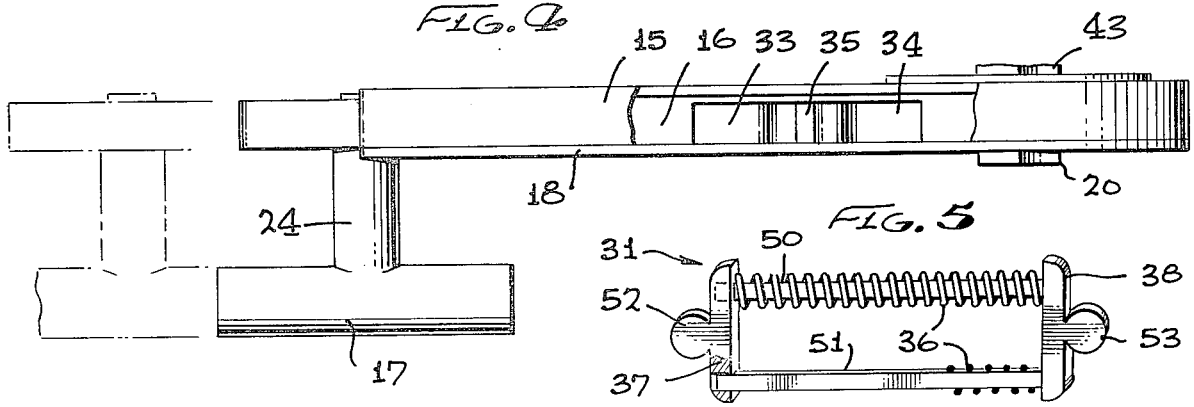
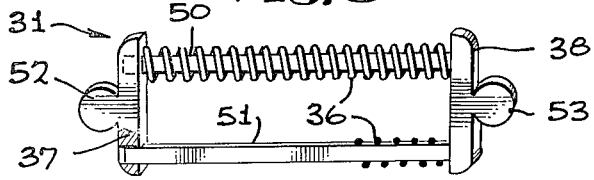

EXTENDABLE CRANK HANDLE

BACKGROUND OF THE INVENTION

1. Field of the Invention

The present invention relates to fishing reel crank handles and more particularly, to a novel crank handle adapted to be extended and retracted to lengthen or shorten the length of the handle so as to increase or decrease the throw of the handle as it is turned by the user.

2. Brief Description of the Prior Art

It has been a conventional practice in the fishing industry to employ a fishing reel which has a cage or frame for rotatably supporting a spool upon which a length of fishing line is wound for storage purposes. The winding is achieved by means of a handle which is rotatably carried on the frame and which is coupled to the spool directly or indirectly through gears so that a variety of spool speeds are provided. Normally, it is difficult to provide a plurality of gears on the reel frame without unduly weighting or complicating the fishing reel as a means for controlling spool winding speed. Also, when a gear box is employed, it generally requires physical disengagement of the crank handle with one drive gear so that it may be physically aligned and engaged with another drive gear in order to effect a change in winding speed. Such a procedure is time consuming and certainly adversely affects the concentration of the fisherman.

The importance of spool real in speed is particularly evident when engaged in the procedure of game fishing in the ocean when a substantial length of fishing line is employed. It is not unusual for a length of fishing line to reach or exceed three to four hundred yards. Obviously, a substantial period of time is required to reel in such line and particularly when the line is loaded with a reluctant game fish. Such practice requires that the fisherman train to perform such a reeling or winding-in procedure which will extend his endurance and resist or retard muscle fatigue.

Although a variety of varying speed drive gears may be employed for regulating the speed of wind-in for the fishing line on a spool, little thought has been given to adjusting the throw of the crank handle diameter of rotation by lengthening or shortening the crank handle itself. By lengthening the handle, more time is required to wind or wrap line on the spool per rotation than the time needed when the length is shortened. Therefore, a long standing need has existed to provide a variable length crank handle which will be adjustable along its length or varying the throw of the handle during rotaton so as to affect the speed of spool reel in of fishing line.

SUMMARY OF THE INVENTION

Accordingly, the above problems and difficulties are obviated by the present invention which provides a novel extendable crank handle which is adjustable lengthwise between a retracted position and extended position so as to selectively change the rotational throw of a crank handle. The inventive crank handle includes an elongated body provided with a central channel open at one end for slidably receiving a crank bar which is moved between the extended and retracted positions to increase or decrease the throw of the crank movement. The body and the slide bar include corresponding cut-out portions for operably carrying an over-center toggle means for yieldably retaining the slide bar in either of the aforementioned two positions. Stop means are provided on the body in cooperative relationship with the slide bar for limiting the movement of the slide bar in either of the two positions.

Therefore, it is among the primary objects of the present invention to provide a novel fishing reel crank handle which may readily vary its length so as to provide for different throws of crank movement.

Another object of the present invention is to provide a novel extendable crank handle which will readily vary the speed of fishing reel wind-in movement of fishing line which may be readily adjusted by the user with his hand performing the cranking movement.

Still another object of the present invention is to provide a novel extendable crank handle which is moved between two positions in order to increase or decrease the throw of the crank movement.

Yet another object of the present invention is to provide a novel extendable crank handle having direct control over the reel-in speed of a spool for storing fishing line.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of a fishing reel employing the inventive extendable crank handle of the present invention;

FIG. 2 is a side elevational view of the fishing reel and extendable crank handle shown in FIG. 1;

FIG. 3 is an enlarged fragmentary view showing component parts of the extendable handle shown in FIGS. 1 and 2;

FIG. 4 is a top plan view of the crank handle shown in FIG. 3 with a portion broken away for clarity; and FIG. 5 is a side elevational view of the over-center toggle mechanism used in the crank handle shown in FIGS. 3 and 4.

DESCRIPTION OF PREFERRED EMBODIMENT

Referring to FIG. 1, a fishing rod is illustrated by the numeral 10 for supporting a fishing reel indicated in the general direction of arrow 11 by means of a suitable clamp or mounting means 12. The fishing reel 11 includes a cage or frame 13 which carries a suitable gear box 14 enclosing drive gears for rotatably driving a spool as shown in FIG. 2 by numeral 15'. The drive gears are actuated by rotation of a crank handle which includes the inventive construction and has an elongated body 15 slidably mounting an extendable portion or bar 16 which terminates in a rotatable finger grip 17. However, in some instances the gear box 14 encloses a direct drive which includes ratchet mechanisms or the like in order to permit free spinning of the spool 15' such as during a casting procedure. These elements are conventional and do not form a part of the present invention so that any conventional gear box, ratchet mechanism, drag mechanism or the like may be employed as desired. By extending or retracting the slide bar 16 with respect to the body 15, the throw of the crank movement is changed.

Referring now in detail to FIG. 2, it can be seen that the spool 15' rotates on the frame or cage 3 upon the turning of crank handle 11. In the position shown in broken lines, the slide bar 16 is in its extended position as shown in broken lines. In the retracted positon, a solid line showing the slide bar and the finger grip is illustrated. A cover 18 encloses the body so as to enclose the slide bar and other mechanisms. A nut 20 holds the handle onto the reel frame or cage.

Referring now in detail to FIG. 3, it can be seen that the slide bar 16 moves in a rectilinear fashion within an elongated channel identified in general by numeral 21. The elongated channel 21 is open at end 22 of the body 15 and closed by a body portion 23 which serves as a limit stop to prevent the slide bar 16 from further movement. The limit stop provided by body portion 23 is effective to stop the slide bar when the turning grip 17 and its attendant shaft 24 is at the extreme end of the body 15 identified by numeral 22. End 22 includes a semi-circular cut-out 25 which accommodates the cylindrical or circular cross section of the shaft 24. The cover 18 is held on one side of the body 15 by means of a plurality of screw fasteners such as screw 26.

The body is further provided with a central cut-out identified by numeral 27 which is defined by sidewalls 28 and 29 which diverge outwardly from a notch 30 to terminate with the channel 21. One side of the cut-out 27 is defined by the material of body 15 which is recessed from the surface against which the cover 18 is engaged and the other side of the cut-out is defined by the inside surface of the cover 18 when it is fastened to the body 15. Therefore, it can be seen that the cut-out is completely enclosed and serves to house an over-center toggle mechanism which is indicated in general by the numeral 31. It can also be seen that the slide bar 16 includes a similar shaped cut-out 32 which is defined between diverging ends 33 and 34 extending from a notch 35 to terminate along the edge of the slide bar adjacent to the terminating ends of the diverging ends 28 and 29 of the cut-out 27. As in the instance of cut-out 27, a portion of the over-center toggle mechanism 31 is partially occupied in the cut-out 32. When the slide bar 16 is in the position shown in solid lines so that the end of the bar is stopped by body portion 23, the over-center toggle mechanism is as shown in solid lines so that the normal bias of a spring 36 forcibly urges the opposite ends 37 and 38 of the mechanism to expand against the body 15 and the bar 16. When the bar 16 is in the position shown in broken lines, the over-center toggle mechanism 31 is compressed in length against the bias of the spring 36 as the mechanism is positioned from the solid line showing to the broken line showing where the normal expansion of the spring again forcibly urges the opposite ends 37 and 38 against the body 15 and the bar 16 to maintain the bar in the extended position.

Therefore, it can be seen that the cover-center toggle mechanism 31 has two positions and that these positions coincide with the retracted position as shown in solid lines and the extended position as shown in broken lines. The opposite ends 37 and 38 of the mechanism include nubs which are pivotally mounted and retained in the respective notches 30 and 35 so that as the bar 16 is moved between the retracted position and the extended positions, the mechanism will pivot about the engagement of the nub on end 37 with the notch 30. Pivoting will take place about an axis which does not move. Although pivoting occurs between the nub attached to end 38 and its receptacle or notch 35, the axis about which it rotates will reposition itself following the movement of the slide bar.

As indicated earlier, the motion of the slide bar is arrested when the end of the bar engages with the body portion 23. Movement in the opposite direction as shown in broken lines is arrested when a shoulder 40 provided at the end of a slot engages with a pin 41 fixedly carried on the body 15 having its terminating end disposed in the channel 21. Therefore, the pin 41 and the body portion 23 provide limit stops between which the slide bar 16 can be moved and the over-center toggle mechanism will yieldably retain the slide bar in the extreme extended or retracted positions once the slide bar has been so displaced or disposed.

It can also be seen in FIG. 3 that the drive shaft for actuating the spool of the fishing reel may take the form of a drive shaft of square cross section and which projects into and through the channel 21 so that the handle is suitably mounted thereon and retained in this position by a nut 20. In order to accommodate movement of the slide bar, the slide bar is provided with an elongated slot which is open at one end and closed at its opposite end and which is indicated in general by numeral 42. The drive shaft is indicated by numeral 43 and is operably coupled to a direct drive or drive reduction gears in the gearhouse 14 which then, in turn, mesh with a suitable conventional drive for the spool 15'. The slot 42 is of sufficient width to accommodate the thickness of the shaft 43 so that the slide bar 16 will move between the extended and retracted positions as set by the limit stops provided by pin 41 and body portion 23.

Referring now in detail to FIG. 4, a portion of the body and cover have been broken away and the over-center toggle mechanism has been removed in order to expose the slide bar 16 and the cut-out 31 which is defined by the tapered opposing sidewalls 33 and 34 and the junction of the sidewalls with the notch 35. Therefore, in FIG. 3, the notch 27 is clearly illustrated and in FIG. 4, the notch 32 is clearly illustrated when taken in context with the showing of the cut-out 32 in FIG. 3.

Referring now in detail to FIG. 5, the over-center toggle mechanism is illustrated wherein the opposite ends 37 and 38 are provided with shafts 50 and 51 therebetween upon which a pair of springs 36 are provided. Without the shafts or rods 50 and 51, the springs may buckle or otherwise distort. The bias of the springs 36 is normally expanding or pushing the opposite ends away from each other so that the respective ends will bear against the shoulders of the body and slide bar respectively adjacent to each of the respective notches 30 and 35. In order to provide a proper rotation or pivot of the toggle mechanism in their respective notches, each end 37 and 38 is provided with a pivot 52 and 53 which substantially occupies each of the respective notches in a moving or rotational relationship.

In view of the foregoing, and in actual practice, the throw of crank movement is substantially changed by extending or retracting the crank handle as described in the foregoing discussion. Such adjustment provision substantially reduces the arm strain of the user when he is reeling in a substantial length of fishing line. For example, lesser time for rotation of the crank handle is required when the handle is in its retracted position as opposed to when the handle is in the extended position. Also, more leverage is provided for the user when a substantial load is carried on the end of the fishing line.

Movement of the slide bar 16 between the positions defined by the stops represented by pin 41 and body portion 23 places the slide bar and crank in either its extended or retracted position. The over-center toggle mechanism is yieldable between the two positions and once the mechanism has crossed the center position when the spring 36 is fully contracted, the spring will then expand to forcibly urge the slide bar into either of the respective positions. It can be seen that the act of increasing or decreasing the crank throw length is accomplished by the inventive concept and mechanism. The limits set for the throw is provided by the stops and are instantaneously derived without the need of any additional unlocking or locking mechanism requiring additional hand or finger movements.

While particular embodiments of the present invention have been shown and described, it will be obvious to those skilled in the art that changes and modifications may be made without departing from this invention in its broader aspects and, therefor, the aim in the appended claims is to cover all such changes and modifications as fall within the true spirit and scope of this invention.

What is claimed is:

1. An extendable crank handle for driving the spool of a fishing reel comprising the combination of:
    an elongated body having a channel provided therein open at one end and closed at its opposite end;
    a slide bar movably carried on said body in said channel having a portion thereof outwardly projecting from said body having said channel open end;
    a finger-grasping member rotatably mounted on said slide bar portion projecting from said body;
    said slide bar having an extended position which increases the throw of crank movement and a retracted position which decreases the throw of crank movement;
    means operably connected between said body and slide bar for yieldably retaining said slide bar in either of its alternate positions; and
    said retaining means is an over-center toggle mechanism pivotably carried at its opposite ends on said body and said slide bar respectively.

2. The invention as defined in claim 1 including:
    said retaining means further includes spring biasing means normally compressed between opposite end pieces of said toggle mechanism so as to forcibly urge said slide bar into either of its alternate positions once the mechanism has crossed over center.

3. The invention as defined in claim 2 including:
    stop means cooperatively carried on said body and said slide bar for limiting the displacement or movement of said slide bar at said alternate positions.

4. The invention as defined in claim 3 wherein:
    said stop means includes a pin carried on said body downwardly depending into said channel and an exposed shoulder carried on said slide bar for limiting movement of said slide bar in its extended position when engaged; and
    a body portion terminating said channel at one end so as to engage with said slide bar to limit movement thereof in its retracted position.

5. The invention as defined in claim 4 including:
    a drive shaft carried on said body and an open-ended slot provided on said slide bar adapted to slide over said drive shaft when moving between said extended and retracted positions.

* * * * *